April 29, 1969     D. F. MOWBRAY     3,441,247

CONNECTOR DEVICES FOR AXIALLY DISPLACEABLE MEMBERS

Filed July 18, 1966

United States Patent Office 3,441,247
Patented Apr. 29, 1969

3,441,247
CONNECTOR DEVICES FOR AXIALLY
DISPLACEABLE MEMBERS
Dorian Farrar Mowbray, Solihull, England, assignor to
Joseph Lucas (Industries) Limited, Birmingham, England, a British company
Filed July 18, 1966, Ser. No. 565,874
Int. Cl. F16k 1/34, 25/00
U.S. Cl. 251—86                    2 Claims

ABSTRACT OF THE DISCLOSURE

A connector device for interconnecting a spool and an operating rod comprises a pair of parts connected to the spool and rod respectively, a deflectable rod between the parts having radial clearance from the spool, the rod transmitting tension loads and the direct abutment between the adjacent ends of the spool and the rod transmitting compression loads above the value which will bend the rod.

---

This invention relates to devices for connecting two members together so as to transmit axial movement of one to the other, the device being capable of accommodating some degree of lack of axial alignment between the members.

The object of the invention is to provide a connector device of the kind referred to in a convenient form.

In accordance with the present invention, a connector device for transmitting axial movement of one member to another comprises a pair of parts adapted for connection to the members respectively, and a deflectable rod extending between the parts with radial clearance at least in the region of the adjacent ends of the parts to permit of limited transverse relative movement between the parts, said rod being arranged to transmit tension loads between the parts by engagement between the ends of the rod and the parts respectively at positions spaced axially from the adjacent ends of the parts, and to transmit compression loads in excess of a predetermined value between the tubular parts by direct abutment between the adjacent ends of the parts.

Figure 1:
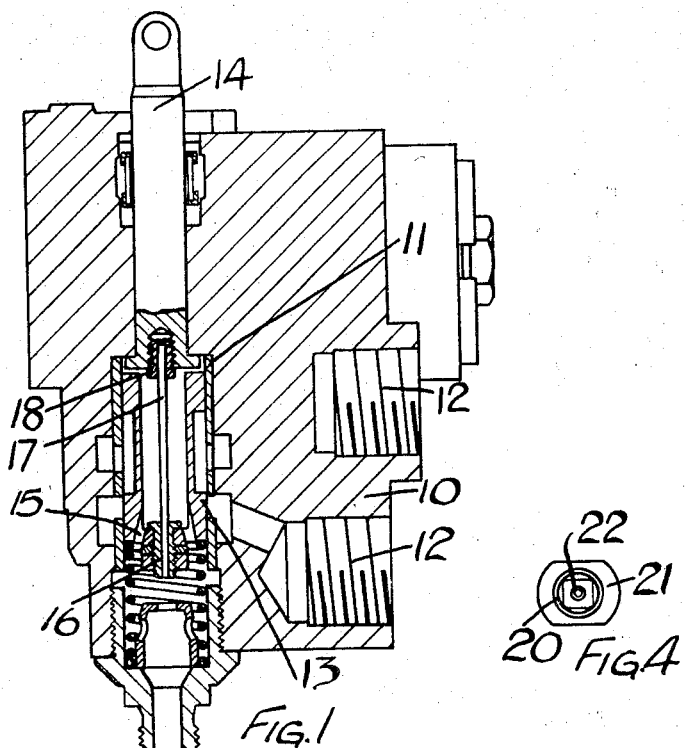
Figure 2:
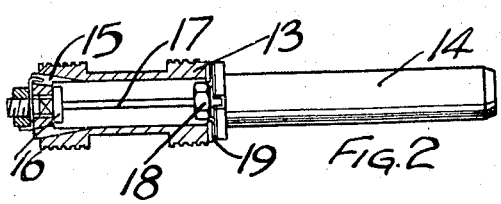
Figure 3:
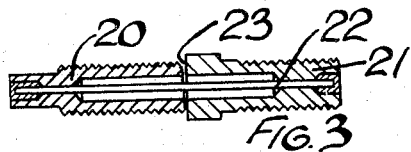

Specific examples of the invention will now be described with reference to the accompanying drawings in which:

FIGURE 1 is a cross-sectional view of a spool valve assembly incorporating the present invention, FIGURE 2 is a cross-sectional view of a connector device for use in the construction of FIGURE 1, and FIGURES 3 and 4 are respective cross-sectional and end elevation views of an alternative form of connector device.

FIGURE 1 illustrates a spool valve assembly in which there is a body 10, having a bore containing an apertured axially fixed hollow sleeve 11. The body 10 has a plurality of passages 12 for access of fluid to the bore through apertures in the sleeve 11 and slidable within the sleeve is a spring-loaded spool 13 which is connected to an operating rod 14 by means of a connector device illustrated more clearly in FIGURE 2.

The connector device incorporates as an outer tubular part thereof the spool 13 which is externally grooved and, engages within the interior of the sleeve 11. One end of the spool is open and the other end is closed except for holes 15. Connected by a bolt 16 to the closed end of the spool 13 is one end of a deflectable metal rod 17 extending with substantial clearance through the spool 13. The opposite end of the rod 17 is connected to a second part of the connector device which comprises a further bolt 18 and the end portion of the operating rod 14.

This end portion is enlarged and provides an axially presented surface adjacent to the end face of the open end of the spool 13. The connection of the ends of the rod 17 to the respective bolts 16, 18 is by brazing.

The adjacent ends of the spool 13 and the operating rod 14 are normally, that is in the unstressed condition, separated by a small axial clearance indicated at 19, this being in the order 0.002 to 0.005 inch, in this example.

In use, if the connector device is placed in tension, the load is transmitted from the operating rod 14 to the spool 13 through the rod 17. If, however, the device is placed in compression and if the compressive load is above a predetermined value, the rod 17 becomes bent so that the clearance between the adjacent ends of the operating rod 14 and the spool 13 disappears so that compressive loads are transmitted by the direct abutment of the adjacent ends of the operating rod 14 and the spool 13. Below this value, however compression is taken by the rod 17 itself. In either tension or compression conditions, or indeed when there is no axial loading upon the connector device, lack of axial alignment can be accommodated by deflection of the rod 17, this deflection being permitted by the clearance between the rod 17 and the interior of the spool 13, at least in the region at which the operating rod and spool ends are adjacent.

In the construction illustrated in FIGURES 3 and 4 the connector device comprises first and second tubular parts 20, 21, and a deflectable rod 22.

The tubular parts 20 and 21 are externally screw threaded to engage the spool closed end and the operating rod 14 respectively and both parts have stepped bores to define, in each case, a reduced diameter portion into which the rod 22 is brazed. The rod 22 extends substantially entirely through both parts 20 and 21 and its mid-region extends through the region of the adjacent end of the parts with a substantial radial clearance.

The adjacent ends of the parts 20, 21 are normally that is in the unstressed condition, separated by a small axial clearance indicated at 23, operation being similar to that of the construction of FIGURES 1 and 2.

Having thus described my invention what I claim as new and desire to secure by Letters Patent is:

1. A spool valve assembly having a spool and an operating rod interconnected by a connector device, the latter having a pair of parts for connection to the spool and operating rod respectively, and a deflectable rod extending between the parts with radial clearance at least in the region of the adjacent ends of the parts to permit of limited transverse relative movement between the parts, said rod being arranged to transmit tension loads between the parts by engagement between the ends of the rod and the parts respectively at positions spaced axially from the adjacent ends of the parts, and to transmit compression loads in excess of a predetermined value between the tubular parts by direct abutment between the adjacent ends of the parts.

2. A connector device for transmitting axial movement from one member to another comprising a pair of parts adapted for connection to the members respectively, screw threaded portions on the parts whereby relative adjustment between the parts and the members can be effected, and a deflectable rod extending between the parts with radial clearance at least in the region of the adjacent ends of the parts to permit of limited transverse relative movement between the parts, said rod being arranged to transmit tension loads between the parts by engagement between the ends of the rod and the part respectively at positions spaced axially from the adjacent ends of the parts, and to transmit compression loads in excess of a predetermined value between the tubular parts, by direct abutment between the adjacent ends of the parts.

References Cited

UNITED STATES PATENTS

| | | | |
|---|---|---|---|
| 663,079 | 12/1900 | Hunter | 251—84 X |
| 839,803 | 1/1907 | Amsler | 64—15 X |
| 2,626,812 | 1/1953 | Jones | 64—15 X |
| 2,745,627 | 5/1956 | Winfree | 251—84 X |
| 2,936,777 | 5/1960 | Kistner | 251—86 X |
| 3,198,203 | 8/1965 | Margida | 251—86 X |

FOREIGN PATENTS 646,572 6/1937 Germany.

M. CARY NELSON, *Primary Examiner.*

ROBERT C. MILLER, *Assistant Examiner.*

U.S. Cl. X.R.

64—15